United States Patent [19]
Ito et al.

[11] Patent Number: 6,082,536
[45] Date of Patent: Jul. 4, 2000

[54] TAPE-CONNECTED FASTENER

[75] Inventors: Yoshitsugu Ito; Ichinari Nakamura; Takumi Harigaya, all of Tokyo, Japan

[73] Assignee: Max Co., Ltd., Tokyo, Japan

[21] Appl. No.: 09/311,164

[22] Filed: May 13, 1999

[30] Foreign Application Priority Data

Nov. 6, 1998 [JP] Japan .................................. 10-316282

[51] Int. Cl.[7] ................................................ B65D 85/24
[52] U.S. Cl. .......................................... 206/344; 411/442
[58] Field of Search ........................... 206/338, 343–345; 411/442, 443

[56] References Cited

U.S. PATENT DOCUMENTS

| | | | |
|---|---|---|---|
| 3,442,374 | 5/1969 | Hillier | 206/344 |
| 3,756,391 | 9/1973 | Keck et al. | 206/344 |
| 4,139,136 | 2/1979 | Catalano | 227/109 |
| 4,343,579 | 8/1982 | Shelton et al. | 206/345 |
| 4,836,372 | 6/1989 | Shelton | 206/344 |
| 5,005,699 | 4/1991 | Kawashima et al. | 206/344 |
| 5,060,797 | 10/1991 | Syganator | 206/345 |

*Primary Examiner*—Jim Foster
*Attorney, Agent, or Firm*—Morgan, Lewis & Bockius LLP

[57] ABSTRACT

A tape-connected fastener comprising a plurality of fasteners and a tape. The fasteners are aligned in parallel, and the tape is pasted onto opposite sides of shaft portions of the fasteners so as to connect the fasteners. The tape has tear-guiding means extending from a lower end portion of one fastener arbitrary selected from the fasteners to an upper end portion of a fastener adjacent to the fastener.

20 Claims, 8 Drawing Sheets

TAPE-CONNECTED FASTENER

BACKGROUND OF THE INVENTION

1. Field of the Invention

The present invention relates to a fastener connected by tape (hereinafter, called as "tape-connected fastener") such as paper-connected nails for use in a nailing machine for building, paper-connected screws for use in a screwing machine for building, or the like. In particular, the present invention relates to a tape-connected fastener for stabilizing the posture of a nail or a screw in nailing or in screwing, respectively.

2. Description of the Related Prior Art

As connected fasteners, plate-like connected nails, connected screws or the like are used. Plate-like connected nails, called as stick nails, are long nails about 65 mm to 90 mm long and connected for use in 2×4 building or the like. There are some types of connected nails or connected screws such as a resin-belt-connected fastener, a paper-connected fastener, and wire-connected nails. The resin-belt-connected fastener is connected by penetrating shaft portions of nails or screws into a belt of resin materials, which are reduced in toughness by mixing calcium carbonate into polypropylene. The paper-connected fastener is connected by bonding shaft portions of nails or screws to reinforced paper tape such as kraft paper or the like with thermoplastic resin. The wire-connected nails are connected by spot-welding a wire with longitudinally intermediate portions of shaft portions of nails to thereby hold the nails.

In the above-mentioned fasteners, the resin-belt-connected fastener is regarded as unsuitable for indoor work because a driver of a nailing machine or a screwing machine hits nails or screws so that the resin belt is broken and crushed, and the crushed portions of the resin belt fly in all directions. Similarly, the wire-connected nails also have such a problem that broken portions of the wire fly in all directions. Therefore, the paper-connected fastener is often used because of its smaller amount of waste and its less danger.

Material which is higher in toughness than the resin material of the resin-belt-connected fastener is used for the bonding agent of the thermoplastic resin used in the paper-connected fastener because it is necessary to bond nails or screws firmly. As a result, the paper-connected fastener is inferior, in instantaneous shearing, to the resin-belt-connected fastener while the amount of paper or resin flying in all directions is small upon shearing.

Figure 7A:
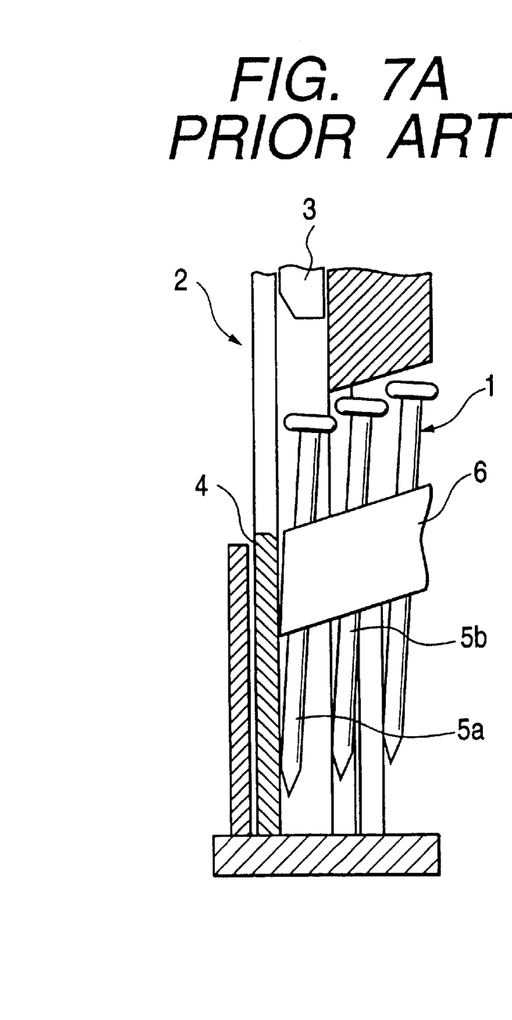
FIGS. 7A to 7C are explanatory diagrams respectively showing steps of driving a conventional paper-connected fastener.
Figure 7B:
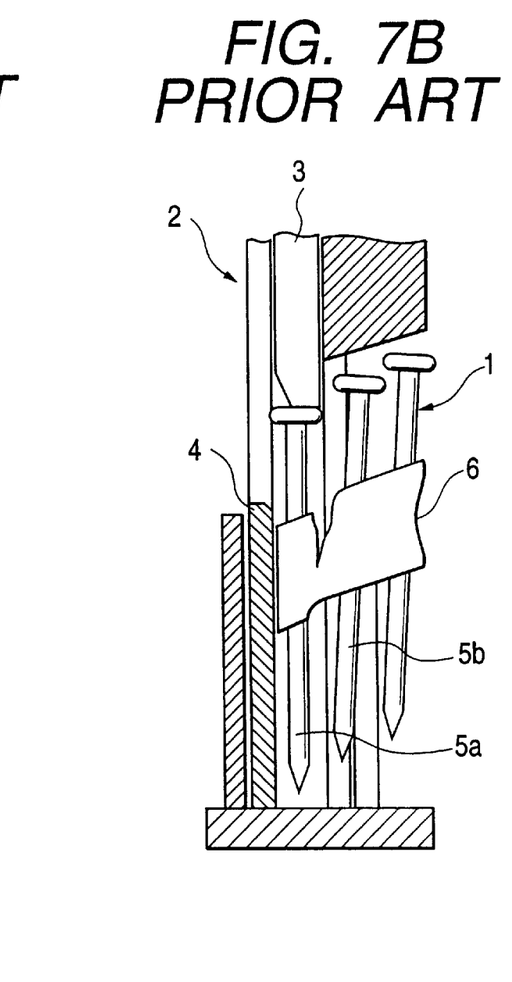
Figure 7C:
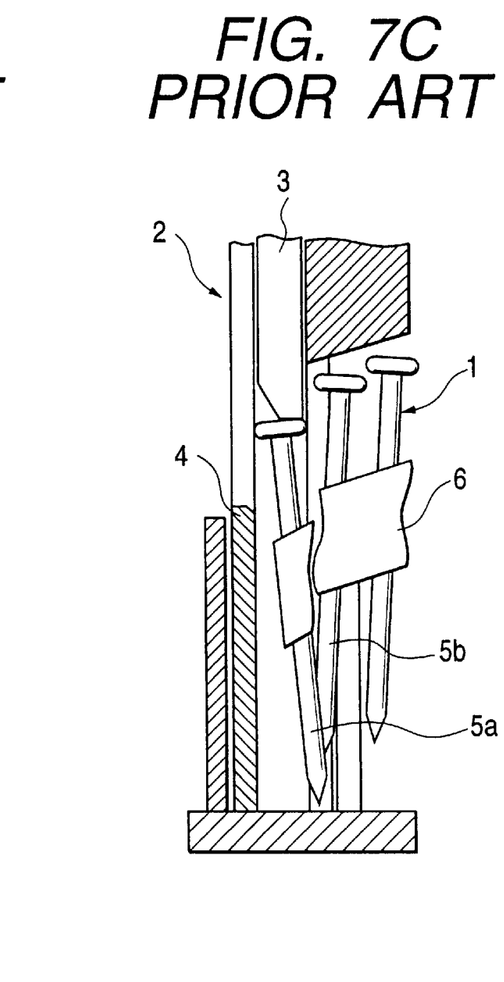

Therefore, as shown in FIG. 7A, when a driver 3 of a nailing machine 2 hits a front nail 5a in a nose 4 to drive paper-connected nails 1, the ductility of the bonding agent prevents paper tape 6 from being sheared instantaneously. Accordingly, the paper tape 6 extends as shown in FIG. 7B so that the nail 5a takes a posture such that the head portion of the nail 5a moves forward as shown in FIG. 7C, while the tip end portion of the nail 5a approaches the next nail 5b. Thus, the paper tape 6 begins to tear from its upper portion toward its lower portion.

Figure 8A:
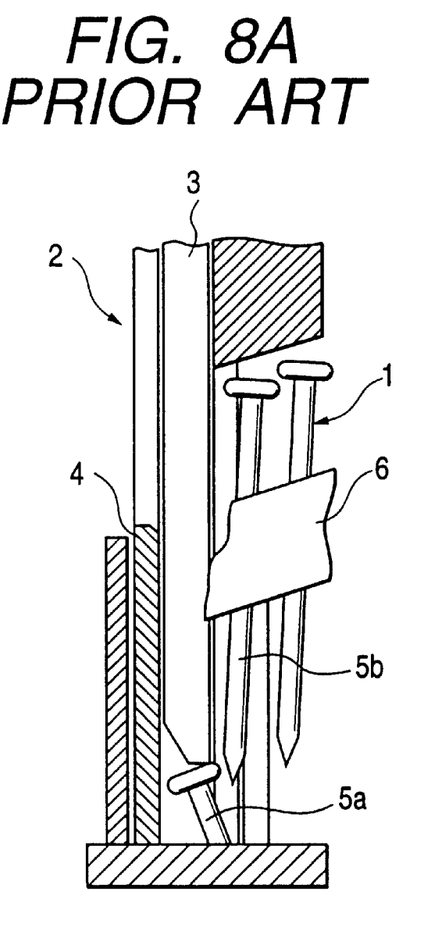
FIGS. 8A to 8B are explanatory diagrams respectively showing steps of driving the conventional paper-connected fastener following FIGS. 7A to 7C.
Figure 8B:
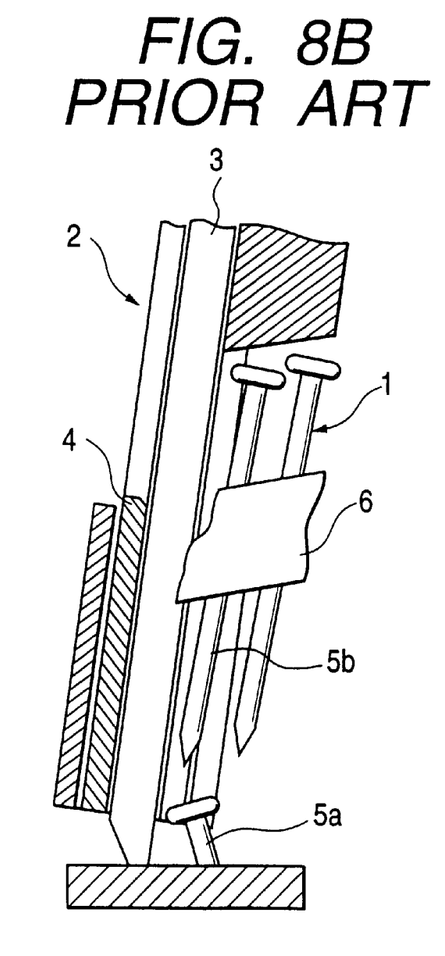

This shearing characteristic, in the paper-connected nails 1, causes a tendency that the nail 5 may make an inclined landing, as shown in FIG. 8A. Consequently, there is a case that the nail head is shifted from a position just under the driver 3 so that the nail 5 cannot be driven vertically. In the worst case, the driver 3 may slip from the nail head to get out of place forward to result in failure in nailing, as shown in FIG. 8B, or the nail may be bent in the nose 4 of the nailing machine 2 to block the nose 4. In addition, such a failure is apt to arise more often especially when a short nail is driven or when a nail is driven into material which is high in hardness and large in driving load.

The above-mentioned phenomenon appears in the same way also in paper-connected screws in which a number of screws are connected by the paper tape. That is, in some cases, a screw in a nose of a screwing machine has a collision with the circumference of a screw chuck provided in the forward end of the nose portion of the screwing machine, so that the screw is not introduced into the screw chuck, but it blocks the nose.

Therefore, there arises a technical problem how to stabilize the posture of a nail or a screw at the time of driving the nail or screw of paper-connected nails or paper-connected screws and how to eliminate the failure in work.

SUMMARY OF THE INVENTION

It is therefore an object of the present invention to solve the foregoing problem. That is, it is an object of the present invention to provide a tape-connected fastener which is stable in the posture of a nail, screw or the like at the time of driving it and to eliminate the failure in work In order to achieve the above object according to the present invention, provided is a tape-connected fastener comprising a plurality of fasteners and a tape. The fasteners are aligned in parallel, and the tape is pasted onto opposite side of shaft portions of the fasteners so as to connect the fasteners. The tape has a tear-guiding means extending from a lower end portion of one fastener arbitrary selected from the fasteners to an upper end portion of a fastener adjacent to the fastener.

In the above-mentioned tape-connected fastener, the tape is preferably made of paper.

It is preferable that the tape has a bonding agent layer thereon. More preferably, the bonding agent layer is made of thermoplastic resin.

The tear-guiding means is preferably arranged over the whole length of the tape. More preferably, the tear-guiding means is a plurality of perforate lines or a plurality of perforations.

In addition, it is also preferable that the fasteners are aligned in such a manner that the fasteners are successively displaced upward.

DETAILED DESCRIPTION OF THE PREFERRED EMBODIMENT

Figure 1A:
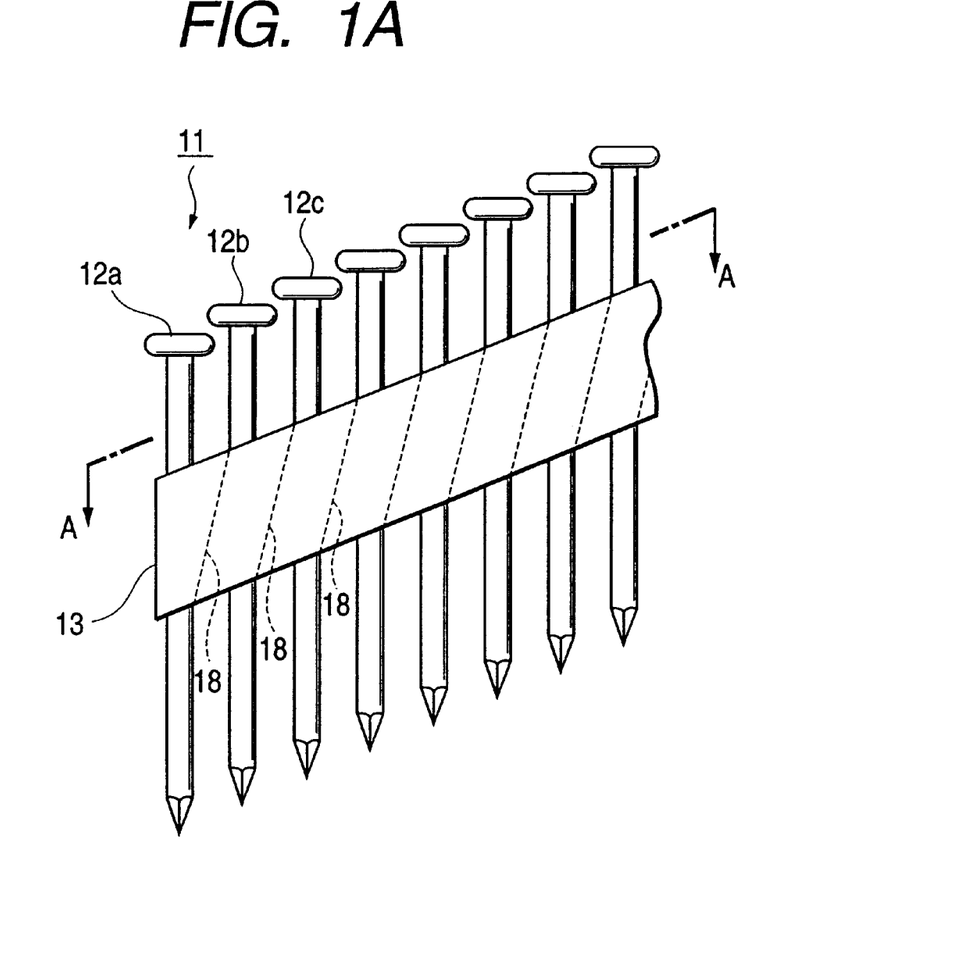
FIG. 1A is a front view of the paper-connected fastener according to an embodiment of the present invention.
Figure 1B:
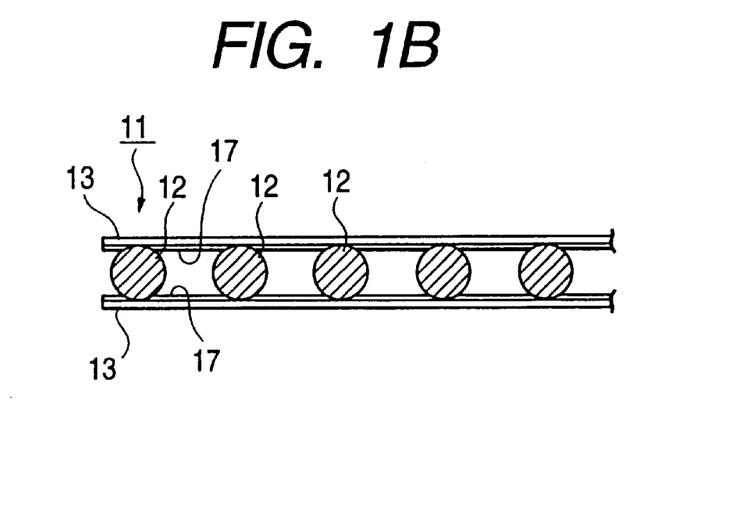
FIG. 1B is a sectional view taken on line A—A in FIG. 1A

An embodiment of this invention will be described below in detail with reference to the drawings. FIGS. 1A to 1B show a paper-connected fastener 11 stated as an embodiment according to the present invention, in which nails 12 are 65 mm, 75 mm or 90 mm long to be used in 2×4 building or the like and connected by paper tape 13.

Figure 2:
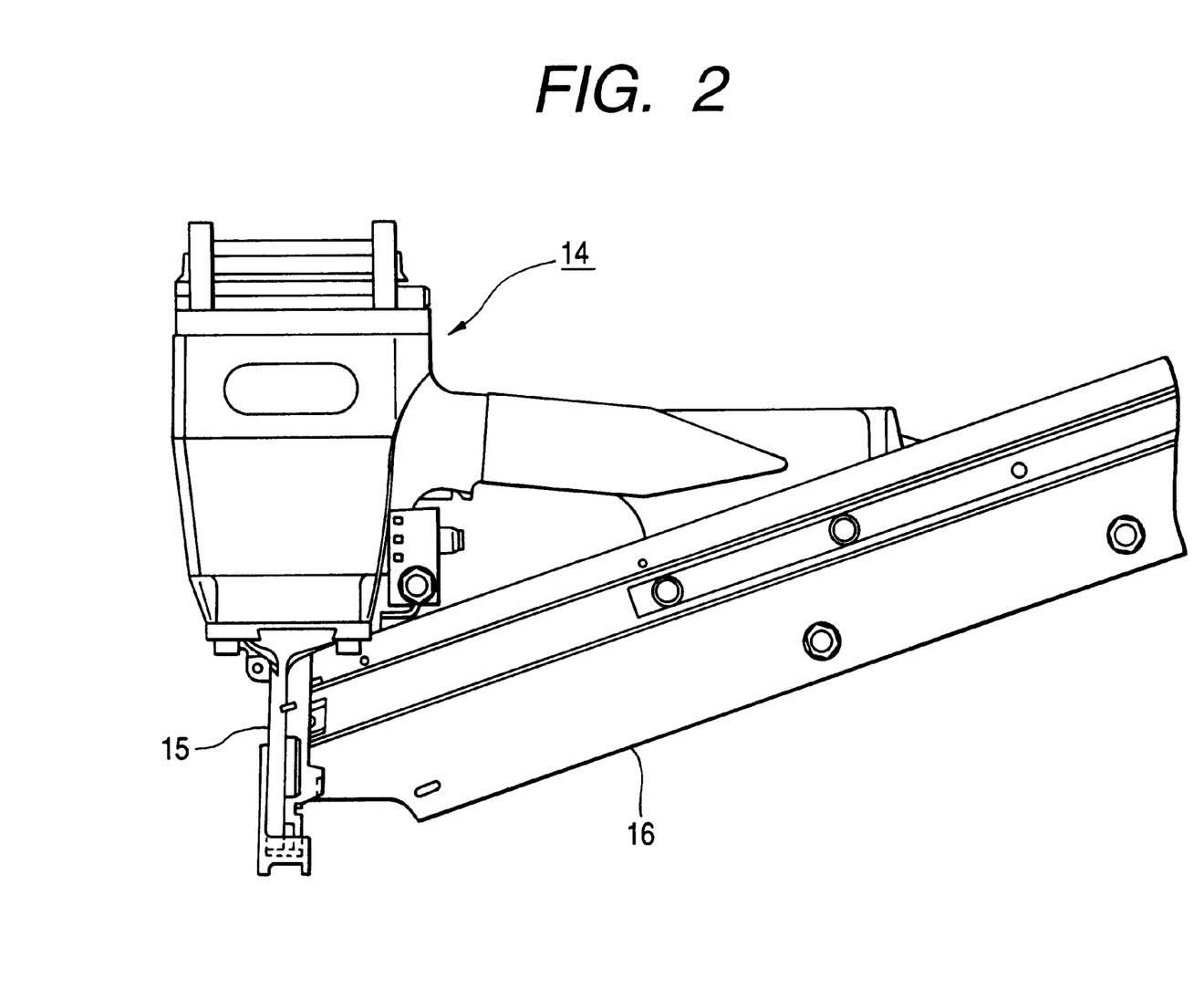
FIG. 2 is a side view of a nailing machine.

In the paper-connected fastener 11, for example, about 25 nails are aligned in parallel such that a foremost nail 12a (left in FIG. 1), and nails 12b, 12c, . . . following the nail 12a are successively displaced upward. Paper tape 13 is pasted to opposite sides of shaft portions of the aligned nails 12, in the same manner as those in a conventional paper-connected fastener. The paper-connected fastener 11 is formed so that the direction of a nose 15 of a nailing machine 14, shown in FIG. 2, and the direction of the respective nails 12 of the paper-connected fastener 11 are substantially parallel with each other when the paper-connected fastener 11 is charged in a stick nail machine-gun 16 connected to the back surface of the nose 15 of the nailing machine 14.

The paper tape 13 shown in FIGS. 1B is produced in a manner such that a bonding agent layer 17 of thermoplastic resin is provided on one surface of reinforced paper tape such as kraft paper or the like impregnated with resin, nitrocellulose lacquer or the like, similarly to the related art. The paper tape 13 is fused on the shaft portions of the aligned nails 12 by heat. Perforated lines 18 is formed in the paper tape 13 in a manner such that each perforated line is inclined from a lower end portion of a bonded portion of a preceding nail to an upper end portion of a bonded portion of a succeeding nail.

To form the perforated lines, there are two methods. One method is such that the perforated lines 18 are formed after bonding the nails 12 with the paper tape 13. The other method is such that the paper tape 13 formed with the perforated lines 18 is bonded to the nails 12. In the method of forming the perforated lines 18 before bonding, there is a degree of freedom in the pitch of perforated lines, the number of perforated lines, the angle of inclination of the perforated lines, etc., and the productivity is also superior. In the method of forming the perforated lines 18 after bonding, the pitch of the perforated lines 18 in the direction of alignment is made coincident with the pitch of the nails 12 so that it is possible to prevent the pitches from being shifted from each other. These two methods have advantages individually, and the method to form the perforated lines 18 should not be limited to either one of them.

In addition, perforations in which small holes are continued at a fixed distance may be formed instead of the perforated lines 18. Taking into consideration a degree of smoothness when torn surfaces of the paper tape 13 slide on each other at the time of nailing, it is more advantageous to reduce the roughness of the torn surfaces. Accordingly, it is considered that perforations should be formed with holes which are as small as possible in size.

Figure 3A:
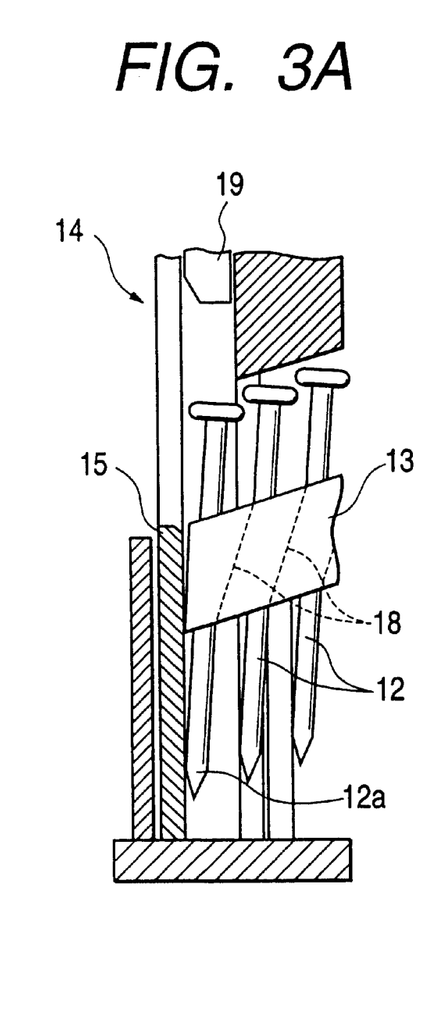
FIGS. 3A to 3C are explanatory diagrams respectively showing steps of driving the paper-connected fastener of FIG. 1A.
Figure 3B:
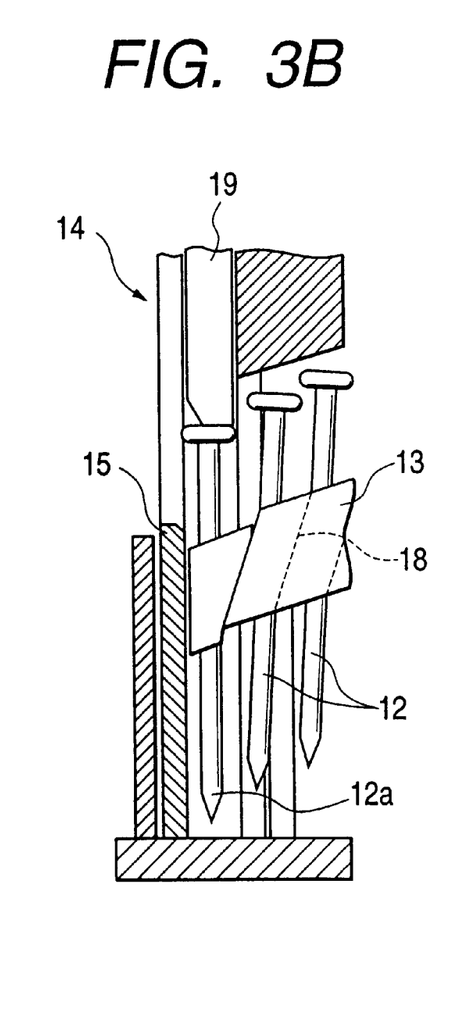

Next, the operation of the paper-connected fastener 11 will be described on the basis of the results of observation of nailing experiments. When a driver 19 of the nailing machine 14 hits the nail 12a in the nose 15 as shown in FIG. 3A, the portion of the perforated line 18 of the paper tape 13 is sheared totally and instantaneously, that is, substantially simultaneously as shown in FIG. 3B., unlike the case of paper tape of a conventional paper-connected fastener having no perforated line.

Figure 3C:
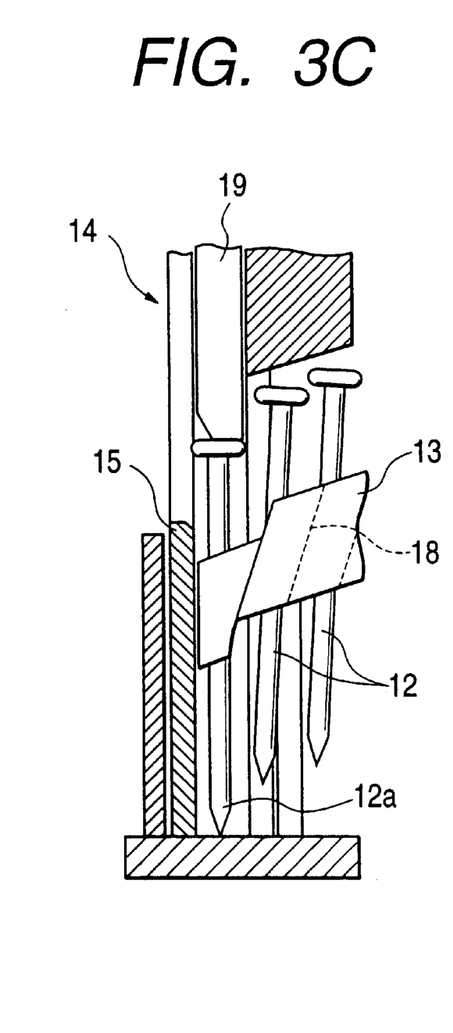
Figure 4A:
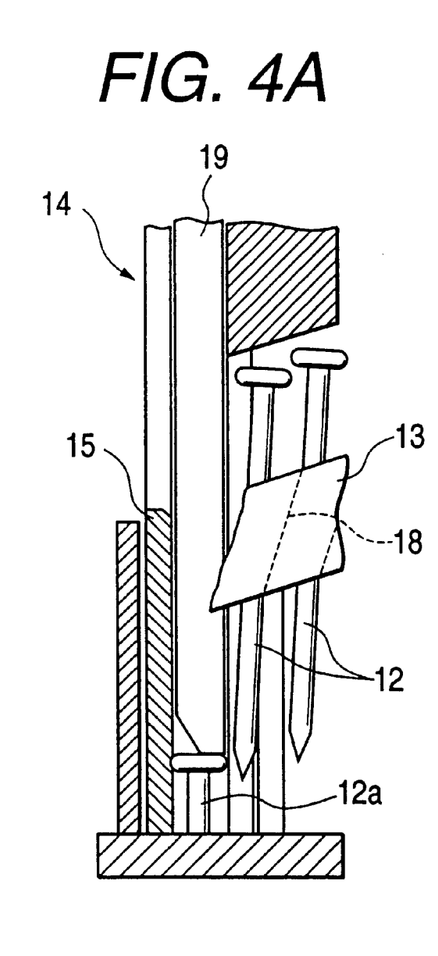
FIGS. 4A to 4B are explanatory diagrams respectively showing steps of driving the paper-connected fastener following FIGS. 3A to 3C.
Figure 4B:
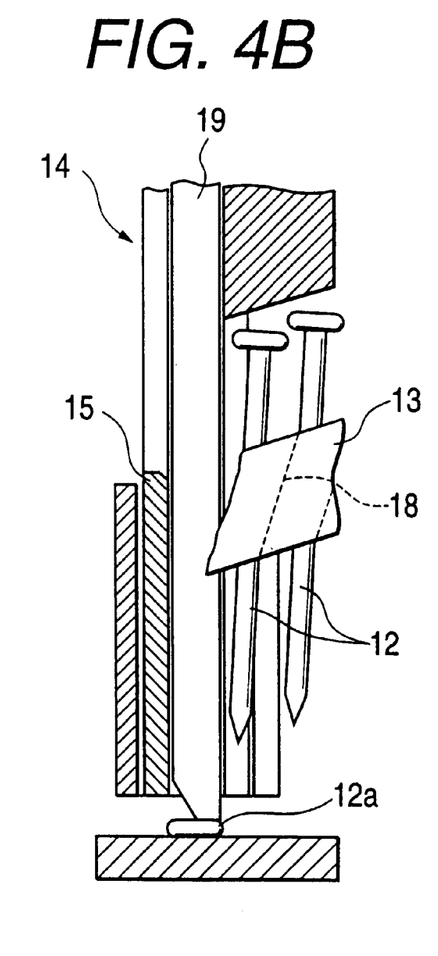

The cut surface of the paper tape 13 along the perforated line 18 is inclined from the rear upper portion toward the front lower portion. Therefore, the nail 12a dropping down with the paper tape 13 sheared is guided by the cut surface and urged forward as a whole, as shown in FIG. 3C. As a result, the front end portion of the nail 12a was prevented from rotating in the rear direction (on the nail machine-gun side), and the head portion of the nail 12a did not move forward than the driver 19, so that the nail 12a is dropped down and landed while keeping its erect-posture as shown in FIGS. 4A and 4B and the head portion of nail 12a could be completely driven. Therefore, there is no fear that the nails 12 are driven in a state where they are inclined, or the driver 19 slips on the nail head and gets out of place. Accordingly, most of failures on driving can be solved.

Figure 5A:
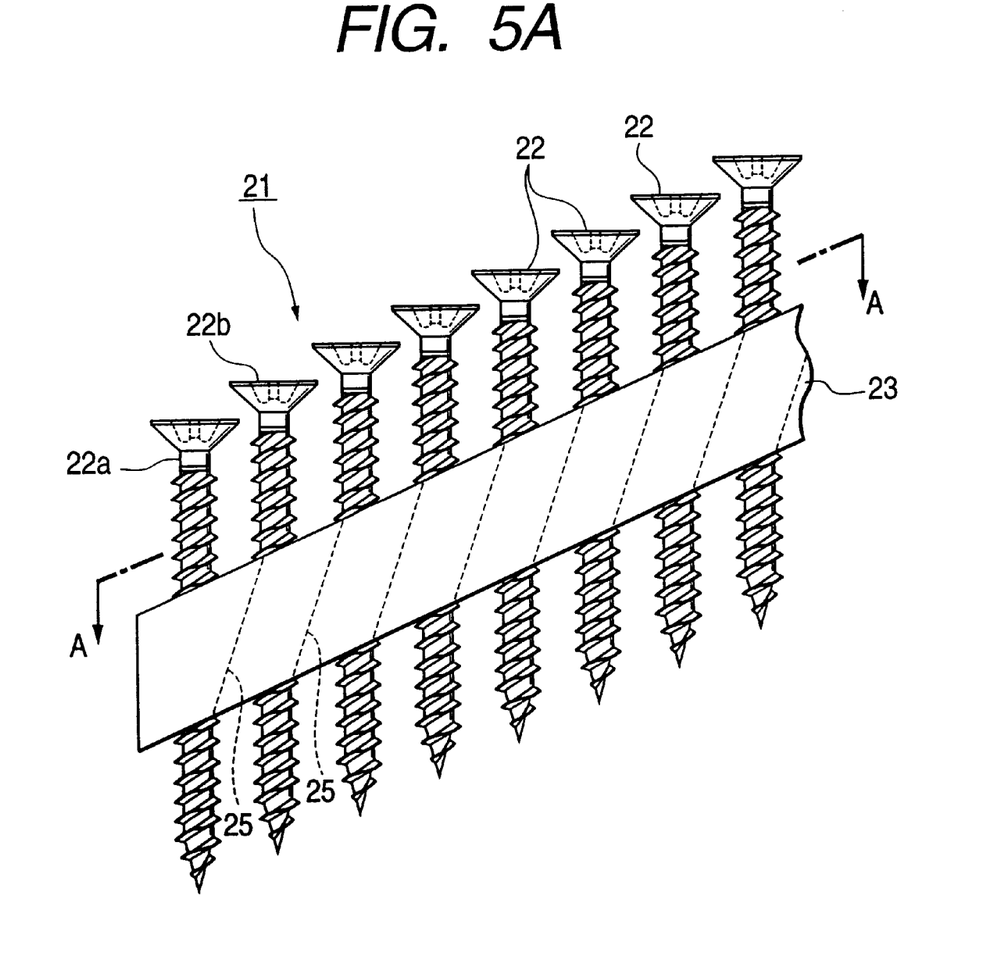
FIG. 5A is a front view of the paper-connected fastener according to another embodiment of the present invention.
Figure 5B:
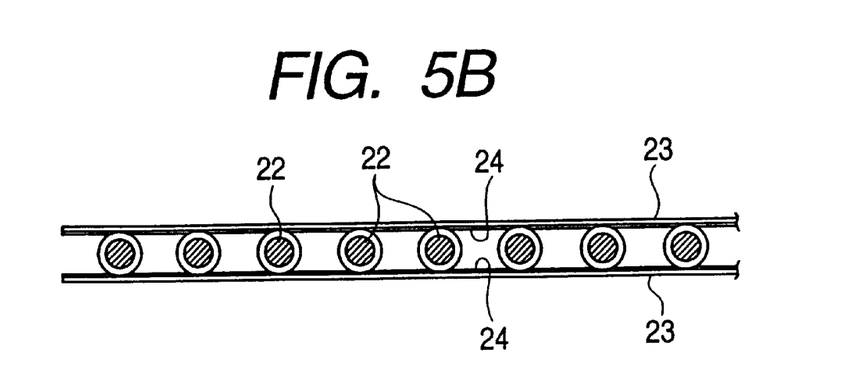
FIG. 5B is a sectional view taken on line A—A in FIG. 5A.

Next, description will be made about a paper-connected fastener with connected screws according to the present invention. As shown in FIG. 5A, in a paper-connected fastener 21, a number of screws 22 with one or a plurality of spiral threads formed in the shaft portions are connected by paper tape 23 in the same manner as in the paper-connected fastener 11 shown in FIG. 1A. The paper tape 23 is disposed so as to be in contact with the threads of nails 22, and the paper tape 23 is bonded with the screws 22 so that a bonding agent layer 24 enters valley portions of the nails 22 partially. The form of the relationship of position, etc., between the screws 22 and the paper tape 23, and the structure of perforated lines 25 formed in inter-nail portions of the paper tape 23 are similar to those of the above-mentioned paper-connected fastener 11.

Figure 6A:
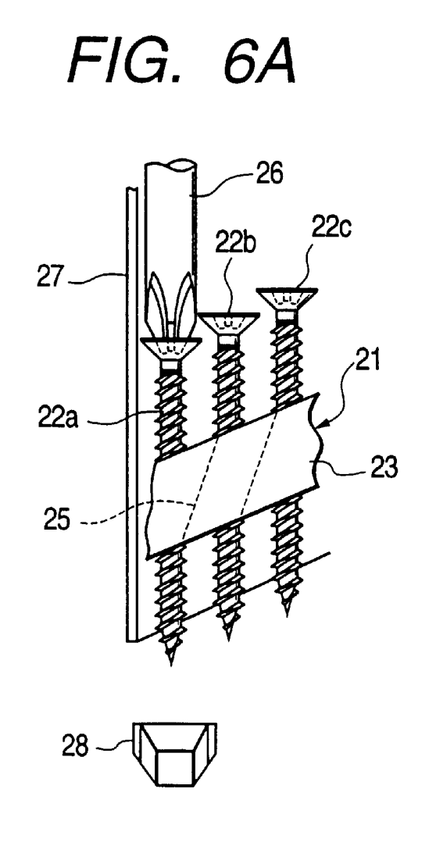
FIGS. 6A to 6C are explanatory diagrams respectively showing steps of driving the paper-connected fastener of FIG. 5A.
Figure 6B:
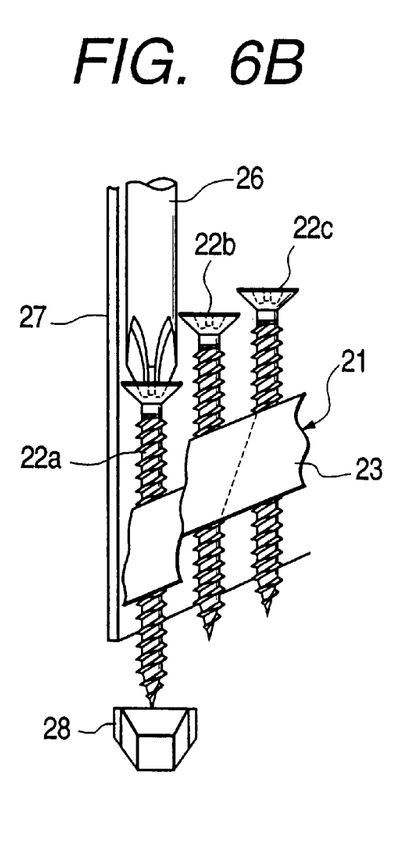
Figure 6C:
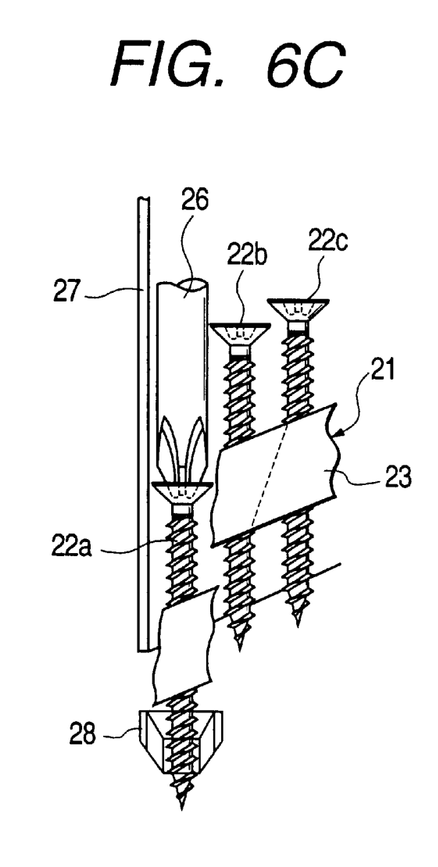

The screwing state where screwing is performed with a screwing machine and the paper-connected fastener 21 will be described with reference to FIGS. 6A to 6C. When a driver 26 of the screwing machine moves down from its stand-by position and hits a foremost nail 22a of the paper-connected fastener 21 supplied to a nose 27 as shown in FIG. 6A, the paper tape 23 is torn, the same manner as the above-mentioned nail driving, along the perforated line 25. The perforated line 25 is inclined between the preceding and succeeding nails 22a and 22b so that the foremost nail 22a is separated from the rest, as shown in FIG. 6B.

The separated nail 22a is guided forward along the inclined torn surface of the paper tape 23. Accordingly, the front end portion of the nail 22a does not rotate backward, and the nail 22a drops down while keeping its erect posture. Therefore, there is no fear that the front end of the nail 22a collides with an opening edge portion of a chuck 28 disposed at the front end of a nose 27 of the screwing machine, or collides with the inner wall surface of the nose, or the like. The nail 22a is surely guided into the center hole of the chuck 28, and the driver 26 stops once in a state where the front end of the nail 22a is projecting downward from the chuck 28, as shown in FIG. 6C.

While the nail 22a is held by the chuck 28 and the driver 26, the front end of the nail 22a is positioned in a screwing position (for example, a threaded hole of a reinforcing metal fittings or the like). When a trigger of the screwing machine is pulled in this state, the driver 26 rotates and moves down further to thereby rotate and drive the screw 22a down into a target material.

This invention is not limited to the above-mentioned embodiments, and various modifications can be made within the technical scope of the invention. Not to say, this invention ranges over those modifications. For example, in the above embodiment, paper tape is explained as means to connect fasteners such as nails and screws; however, other materials are also applicable as a tape-like member to connect fasteners.

As described above, a paper-connected fastener according to the present invention is configured so that tear-guiding means such as perforated lines or perforations are provided in inter-fastener portions of paper tape for connecting fasteners. Accordingly, the shearing speed of the paper tape is high when a fastener is hit by a driver of a nailing machine or a screwing machine. In addition, since the perforated lines or the like are inclined with respect to nails or screws, the torn surface is inclined so that a fastener separated from the paper tape is guided by the torn surface to move down into a nose while keeping its erect posture. Accordingly, there hardly happens such a case where a fastener is driven in a state that it is inclined or bent in the nose. Accordingly, there is obtained an effect to improve the stability and to prevent mistakes in working.

The present invention is based on Japanese Patent Application No. Hei. 9-317374 and Hei. 10-316282, which is incorporated herein by reference.

What is claimed is:

1. A tape-connected fastener comprising;
    a plurality of fasteners aligned substantially parallel to each other; and
    a tape adhered onto opposite sides of shaft portions of said fasteners to connect said fasteners, said tape having tear-guiding means extending from a lower end portion of one of said fasteners to an upper end portion of a fastener adjacent to said one fastener.

2. The tape-connected fastener according to claim 1, wherein said tape is made of paper.

3. The tape-connected fastener according to claim 1, wherein said tape has a bonding agent layer thereon.

4. The tape-connected fastener according to claim 1, wherein said bonding agent layer includes a thermoplastic resin.

5. The tape-connected fastener according to claim 1, wherein said tear-guiding means is arranged over the whole length of said tape.

6. The tape-connected fastener according to claim 1, wherein said tear-guiding means includes a plurality of perforate lines.

7. The tape-connected fastener according to claim 1, wherein said tear-guiding means includes a plurality of perforations.

8. The tape-connected fastener according to claim 2, wherein said tear-guiding means includes a plurality of perforate lines.

9. The tape-connected fastener according to claim 2, wherein said tear-guiding means includes a plurality of perforations.

10. The tape-connected fastener according to claim 1, wherein said fasteners are aligned such that said fasteners are successively displaced upward.

11. The tape-connected fastener according to claim 1, wherein said fasteners are one of nails and screws.

12. A tape-connected fastener, comprising:
    a plurality of fasteners aligned substantially parallel, each fastener having a shaft portion; and
    a tape pasted onto opposite sides of the shaft portions of said fasteners to connect said fasteners, said tape having an upper edge, a lower edge and tear-guiding means extending between the upper and lower edges between adjacent ones of said fasteners.

13. The tape-connected fastener according to claim 12, wherein said tear-guiding means extends between the lower edge at a position adjacent a first one of said fasteners and the upper edge at a position adjacent a second one of said fasteners.

14. The tape-connected fastener according to claim 12, wherein said tape includes paper.

15. The tape-connected fastener according to claim 12, wherein said tape has a bonding agent thereon.

16. The tape-connected fastener according to claim 12, wherein said bonding agent includes a thermoplastic resin.

17. The tape-connected fastener according to claim 12, wherein said tear-guiding means includes a plurality of perforate lines.

18. The tape-connected fastener according to claim 12, wherein said tear guiding means includes a plurality of perforations.

19. The tape-connected fastener according to claim 12, wherein said fasteners are aligned successively displaced upward.

20. The tape-connected fastener according to claim 12, wherein said fasteners are one of nails and screws.

* * * * *

UNITED STATES PATENT AND TRADEMARK OFFICE
CERTIFICATE OF CORRECTION

PATENT NO. : 6,082,536
DATED : July 4, 2000
INVENTOR(S) : Ito et al.

It is certified that error appears in the above-identified patent and that said Letters Patent is hereby corrected as shown below:

Claim 2, line 10, change "is made of paper" to --includes paper--.

Signed and Sealed this

Twenty-ninth Day of May, 2001

Attest:

NICHOLAS P. GODICI

Attesting Officer     *Acting Director of the United States Patent and Trademark Office*